United States Patent [19]
Scott et al.

[11] Patent Number: 5,167,203
[45] Date of Patent: Dec. 1, 1992

[54] PET SAFETY RESTRAINT

[76] Inventors: David Scott, P.O. Box 345 Foxstrap, Conception Bay South, Newfoundland A0A 2J0, Canada; Frederic Stack, 205 Logy Bay Road, St. John's, Newfoundland A1A 3T7, Canada; Coleman Stack, 3 Earl Street, St. John's, Newfoundland A1E 3J9, Canada

[21] Appl. No.: 778,406
[22] Filed: Oct. 17, 1991
[51] Int. Cl.⁵ .............................................. A01K 27/00
[52] U.S. Cl. ...................................... 119/96; 297/468; 297/485
[58] Field of Search .................. 119/96; 297/485, 250, 297/468, 464; 280/801, 802

[56] References Cited

U.S. PATENT DOCUMENTS

| | | | |
|---|---|---|---|
| 3,310,034 | 3/1967 | Dishart | 119/96 |
| 4,676,198 | 6/1987 | Murray | 280/801 |
| 4,715,618 | 12/1987 | Harris | 119/96 |
| 4,907,541 | 3/1990 | Thompson | 119/96 |
| 5,035,203 | 7/1991 | Cardenas | 119/96 |

FOREIGN PATENT DOCUMENTS

| | | | |
|---|---|---|---|
| 0065509 | 11/1982 | European Pat. Off. | 119/96 |
| 2594079 | 8/1987 | France | 119/96 |
| 8800540 | 1/1988 | PCT Int'l Appl. | 119/96 |

*Primary Examiner*—John G. Weiss
*Attorney, Agent, or Firm*—Andrus, Sceales, Starke & Sawall

[57] ABSTRACT

A pet safety restraint is disclosed for the restraining of a pet in a vehicle equipped with a seat belt. The pet safety restraint includes a harness portion for securement around the body of a pet, the harness portion having a pair of lateral straps for respectively extending along the sides of the pet's body, and an attachment frame for connecting the lateral straps with the vehicle seat belt at spaced apart locations along the seat belt. The attachment frame has at least one seat belt receiving opening and the lateral straps of the harness portion are respectively affixable to the attachment frame at attachment points which are spaced apart in the longitudinal direction of the seat belt. The lateral straps each include a buckle for selective separation of the harness portion from the attachment frame. The pet safety restraint limits forward and lateral movement of pet during head-on and sideways collisions respectively, may be used in both the cargo area and the passenger compartment of the vehicle and is universally usable in combination with different types of seat belts.

11 Claims, 5 Drawing Sheets

PET SAFETY RESTRAINT

BACKGROUND OF THE INVENTION

1. Field of the Invention

This invention relates to harnesses for animals and particularly to safety harnesses for the restraining of a pet such as a cat or dog, in a vehicle.

2. Brief Description of the Prior Art

When a pet is transported in the cargo area or the passenger compartment of a vehicle, it is desirable to restrain the pet so as to prevent it from being tossed about in the vehicle during abrupt stops or collisions. This will not only protect the passengers of the vehicle from injury, when the pet is riding with them in the passenger compartment, but also prevent injury to the pet itself. Various pet safety harnesses are known, which restrain a pet in a vehicle in different ways.

U.S. Pat. No. 4,817,562 to Giroux discloses a Vehicular Pet Restraint which includes a harness portion for restraining a pet and right and left side attaching straps respectively provided with a latch member for releasable interlocking engagement with mating members affixed to right and left straps of a vehicle seat belt respectively. This device restrains the pet to limit its forward as well as sideways movement during front and side collisions. However, since the latch members of the attaching straps directly engage complementary vehicle seat belt buckle portions, different latch members or adaptors are required for different seat belt models. Also the pet restraint may only be used in the passenger compartment of the vehicle.

U.S. Pat. No. 4,896,630 by Luce describes an Animal Safety Seat Belt, which includes an upper and lower restraint, front and rear straps affixed thereto for positioning around the body of an animal and a securement strap affixed to the rear end of the upper or lower restraint. The securement strap has an adjustable loop at its front end for securing the animal to a structural member of a vehicle such as a seat or a head-rest. This safety seat belt is independent of the vehicle seat belts and protects the animal from being forwardly thrown in the vehicle, but permits lateral movement of the animal during sideways collisions.

U.S. Pat. No. 4,907,541 by Thompson teaches a transportable pet restraint for restraining a pet within certain bounds in a vehicle. The restraint includes a harness and a clasp, which joins the harness with an existing seat belt of the vehicle. The harness has a belly band, a chest band joined to the belly band, a collar joined to the chest band and a member connecting the belly band and the collar with the clasp on the back of the pet. Once again, different clasps or adapters are required for attachment of the pet restraint to different seat belt models and the single attachment point on the back of the pet allows lateral movement of the pet during a sideways collision. Also, this restraint is directly attached to a vehicle seat belt buckle only, and, thus, may only be used in a vehicle's passenger compartment.

Consequently, a pet restraint for a vehicle is desired which limits forward and lateral movement of the pet during head-on and sideways collisions respectively, which may be used in both the cargo area and the passenger compartment of the vehicle and which is universally usable in combination with different types of seat belts.

SUMMARY OF THE INVENTION

Accordingly, the invention provides a pet safety restraint for use in a vehicle equipped with a seat belt having two interlocking ends, the restraint including a harness means for securement about the body of the pet, the harness means having a pair of lateral straps respectively extending along the sides of the body of the pet; and attachment means for connecting the lateral straps of the harness means with the vehicle seat belt at spaced apart locations along the seat belt, the attachment means having at least one seat belt opening for receiving the vehicle seat belt and the lateral straps of the harness means being respectively affixable to the attachment means at attachment points which are spaced apart in the longitudinal direction of the seat belt.

In another aspect of the invention, the pet safety restraint includes a fastening means for rigidly affixing the attachment means to a structural element of the vehicle.

The attachment means is preferably an elongated rigid attachment frame having a pair of opposite ends and two spaced apart openings respectively located at the opposite frame ends of the attachment frame, the openings permitting the passage through them of an end of the vehicle seat belt.

In a preferred embodiment, each lateral strap extends rearwardly from the harness means, when the harness means is positioned on the pet, and has a rear end, and includes a connecting means for releasably interconnecting the attachment means with the harness means. The rear end of each lateral strap is affixed to the attachment means, and the connecting means is positioned intermediate the attachment means and the harness means. The connecting means is preferably a releasable buckle having interlocking complementary male and female latching members. Furthermore, that portion of each lateral strap which extends between the attachment means and the connecting means preferably includes adjustment means for length adjustment of this portion.

In another preferred embodiment, the lateral straps are connected by a flexible breast strap extending about the breast of the pet when the harness means is positioned on the pet.

The harness means preferably includes a flexible chest strap and a flexible belly strap, the chest strap extending in a loop around the chest and over the neck of the pet when the harness means is positioned on the pet and the belly strap extending in a loop under the abdomen and over the back of the pet.

In still another preferred embodiment, the breast strap, the chest strap, and the belly strap are permanently affixed to both the lateral straps and each include adjustment means for adjustment of their circumference.

BRIEF DESCRIPTION OF THE DRAWINGS

The pet safety restraint disclosed herein will now be further described by way of example only and with reference to the following drawings, wherein.

DESCRIPTION OF THE PREFERRED EMBODIMENTS

Figure 1:
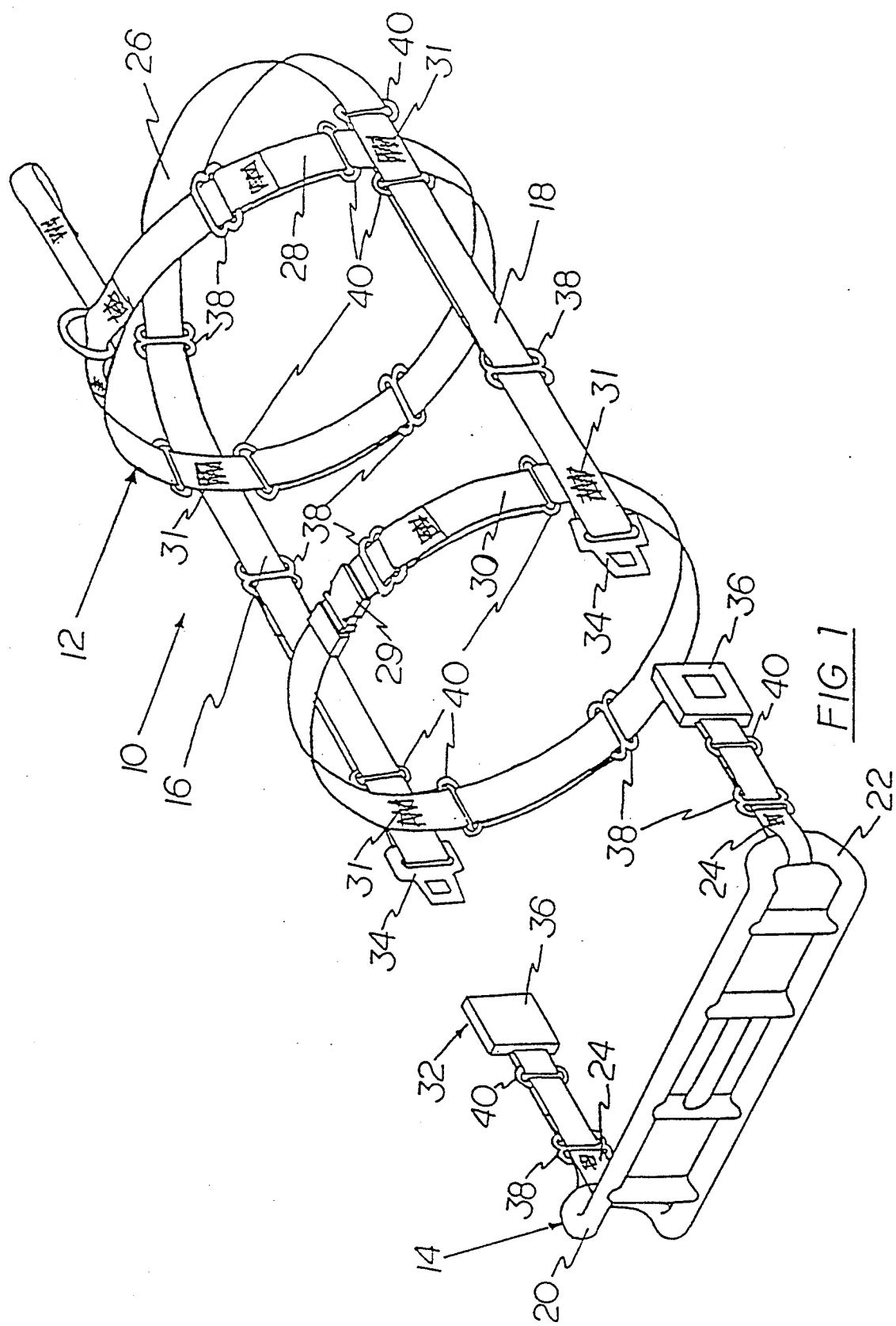
FIG. 1 shows a preferred embodiment of the pet safety restraint disclosed herein.

A preferred embodiment of the pet safety restraint as disclosed herein, is generally referred to by reference numeral 10, in FIG. 1. The pet safety restraint 10 includes a harness portion 12 for the restraining of a pet and a rigid, elongated attachment frame 14 for the fastening of the pet safety restraint 10 to a vehicle seat belt in a manner which will be described in detail with reference to FIGS. 2 and 3. The harness portion 12 includes a pair of flexible lateral straps 16, 18 which are at one end respectively permanently affixed by stitched together loops 24 to spaced apart opposite frame ends 20, 22 of the attachment frame 14 and are at their other end connected by an integral flexible breast strap 26. A flexible chest strap 28 and a flexible belly strap 30 are rectangularly stitched at 31 to both lateral straps 16, 18, the stitching separating each strap into two semi-annular sections. The chest strap 28 is positioned adjacent to the juncture between the lateral straps 16, 18 and the breast strap 26 and the belly strap 30 is positioned intermediate chest strap 28 and the attachment frame 14. Lateral straps 16, 18 each include a buckle 32 having complementary interengageable male and female latching members 34, 36. Buckles 32 are positioned intermediate attachment frame 14 and belly strap 30 to permit separation of the harness portion 12 from the attachment frame 14. The separated harness portion 12 may then be used as a walking harness for a pet as will be further described in connection with FIG. 5. All straps are made of nylon webbing and are sewn to CSA (Canadian Standards Association) standards using nylon thread. Furthermore, all joints in the nylon webbing of the straps are positioned towards the outside so as not to create any area of discomfort for the pet.

For adjustment of their circumference, the breast strap 26 and the semi-annular sections of the chest strap 28 and the belly strap 30 are each provided with a sliding clasp 38 and an eyelet 40. Corresponding clasp and eyelet combinations 38, 40 are provided for length adjustment on both lateral straps 16, 18 between the belly strap 30 and the chest strap 28 on one hand and the buckles 32 and the attachment frame 14 on the other hand. The chest strap 28 and the belly strap 30 are respectively provided with a quick release buckle 29. Only the quick release buckle 29 of belly strap 30 is illustrated in FIG. 1 for reasons clarity. The quick release buckles 29 allow easy and quick securement and removal of the harness portion 12 to and from a pet. Thus, the preferred embodiment of the pet safety restraint 10 as shown in FIG. 1 may be easily positioned on a pet and adjusted to snugly fit the bodies of differently sized pets.

Figure 2:
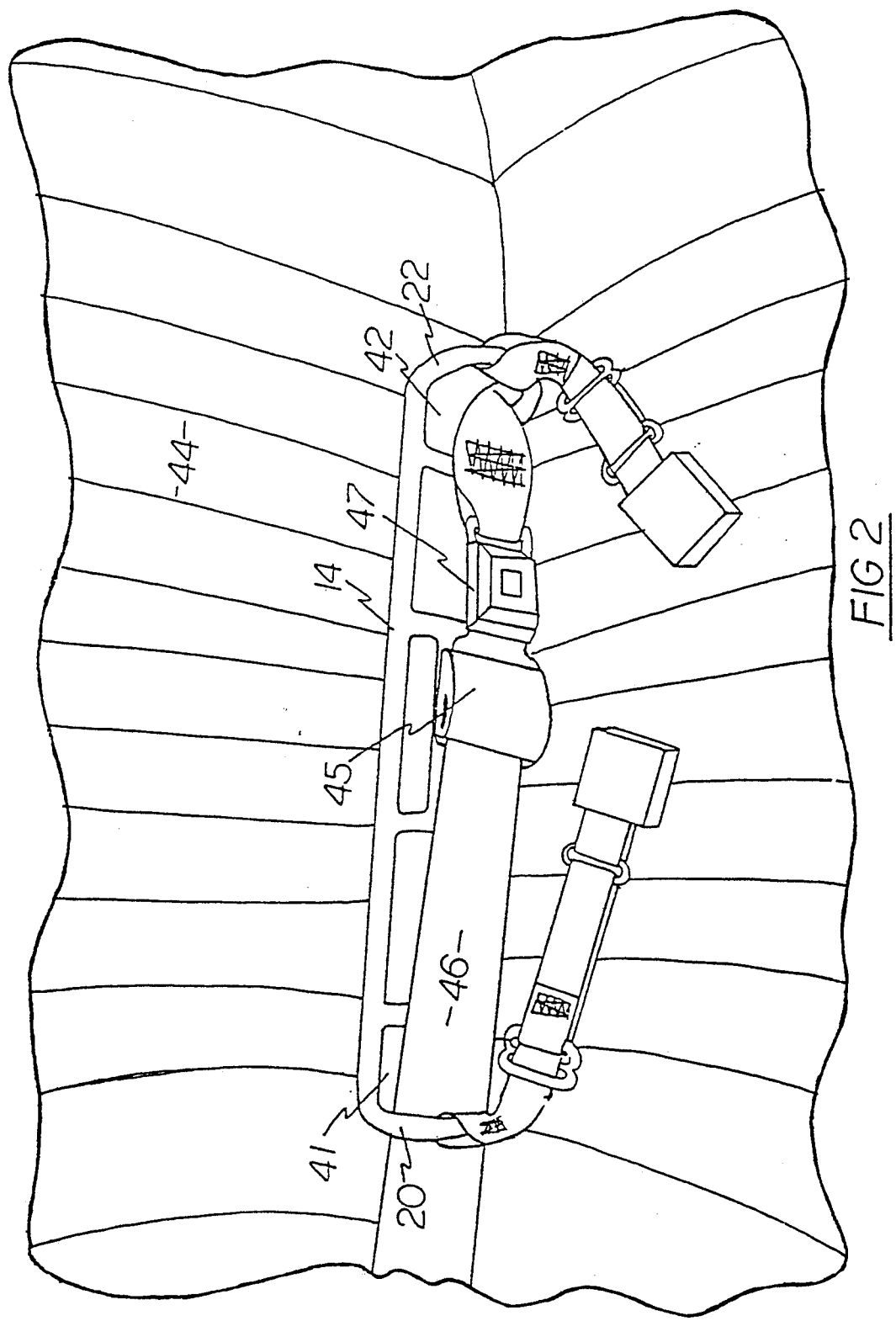
FIG. 2 illustrates the attachment frame of the embodiment shown in FIG. 1 fastened to a vehicle seat by a vehicle seat belt.

Turning now to FIG. 2, the attachment frame 14 has two spaced-apart seat belt openings 41, 42 respectively located adjacent the frame ends 20, 22. The seat belt openings 41, 42 are constructed to allow the passage of any conventional seat belt buckle. To fasten the attachment frame 14 to a vehicle seat belt 44, the ends of the vehicle seat belt 46 respectively carrying interlocking male and female buckle portions 45, 47 are threaded through openings 40 and 42 and then connected with each other over the attachment frame 14.

Figure 3:
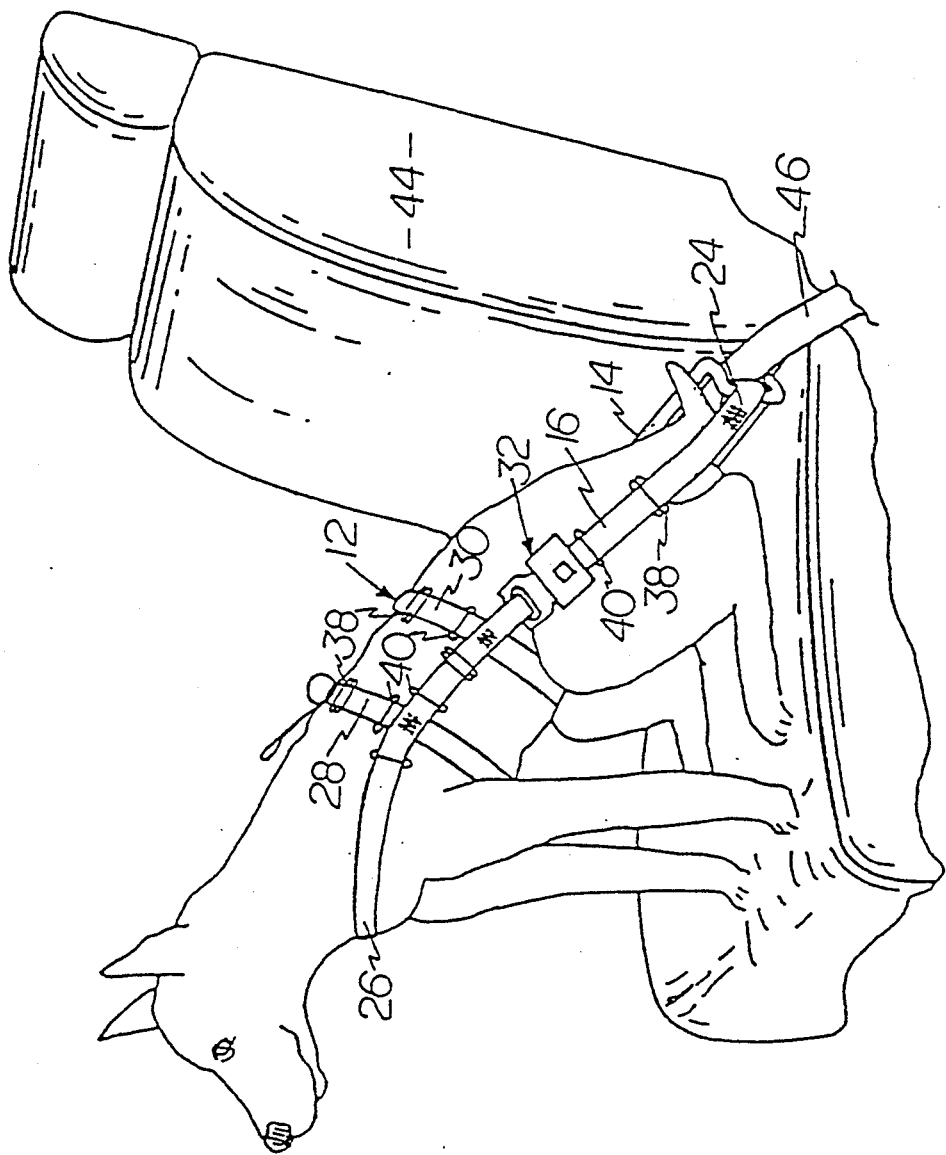
FIG. 3 is a schematic illustration of a pet restrained on a vehicle seat by the embodiment shown in FIG. 1.

The attachment frame 14 is then pulled against the vehicle seat 44 through manual or automatic tightening of the seat belt 46. Subsequently, the attachment frame 14 may be used in combination with harness portion 12 to restrain the pet on vehicle seat 44 as shown in FIG. 3. Of course, the vehicle seat belt 44 may be threaded through seat belt openings 40,42 and fastened in such a way that the seat belt buckle portions 45,47 are positioned to the side of and not over the attachment frame 14.

FIG. 3 illustrates a pet which is restrained to a vehicle seat 44 by a pet safety restraint 10 as disclosed herein. When the pet safety restraint 10 is positioned on a pet, chest strap 28 extends in a loop around the chest and over the neck of the pet immediately behind the pet's front legs. Lateral straps 16, 18 (only one shown), are adjusted so that belly strap 30 extends in a loop under the abdomen and over the back of the pet and at a position just before the pet's hind legs. Breast strap 26, which connects the front ends of lateral straps 16, 18 extends about the breast of the animal to prevent the chest and belly straps 28, 30 of the harness portion 12 from sliding rearwardly on the animal's body, when pull is exerted on the rear ends of the lateral straps 16, 18. The circumference of the breast strap 26 and of the semi-annular portions of the chest and belly straps 28, 30 is appropriately adjusted by sliding buckle and eyelet combinations 38, 40 to snugly fit harness portion 12 to the pet's body while avoiding discomfort to the pet. That portion of lateral straps 16, 18 which extends between buckle 32 and attachment frame 14 is adjusted in length to allow only minimal movement of the pet in forward and lateral direction. It will be readily apparent from this drawing and the drawing of FIG. 2 that the spaced-apart attachment of the lateral straps 16, 18 to attachment frame 14 provides for only limited lateral movement of the pet during sideways collisions so that an increased protection of the pet against injury is achieved.

Figure 4:
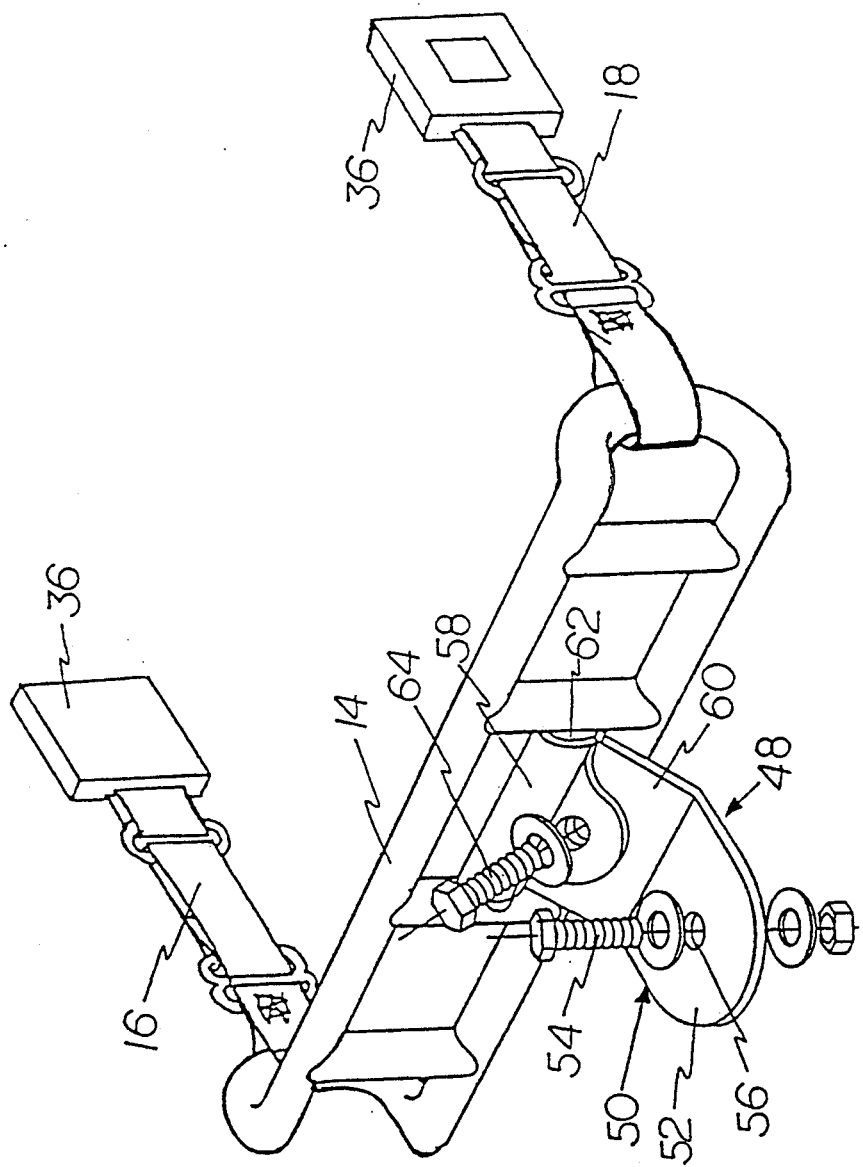
FIG. 4 illustrates the attachment frame of another preferred embodiment of the pet safety restraint as disclosed herein.

Turning now to FIG. 4, the attachment frame 14 in another preferred embodiment includes an anchoring member 48 for the fastening of the attachment frame to a structural member of a vehicle. The anchoring member 48 includes a base plate 50, which has a flat portion 52 to be fastened by a screw 54 that extends through a bore 56 of flat portion 52 into a structural member of the vehicle, for example, a truck cargo bed or the floor of the cargo area of a passenger van (not illustrated). A top plate 58 is fastened against an angularly upwardly directed portion 60 of base plate 50 by a bolt 64. Both top plate 58 and upwardly directed portion 60 have cooperating ends of semi-circular cross-section which tightly surround and rigidly hold a cross-bar 62 of the attachment frame 14, when bolt 64 is tightened. Thus, attachment frame 14 may be rigidly fastened by anchoring member 48 to a structural member of the vehicle independent of the vehicle seat belts.

Figure 5:
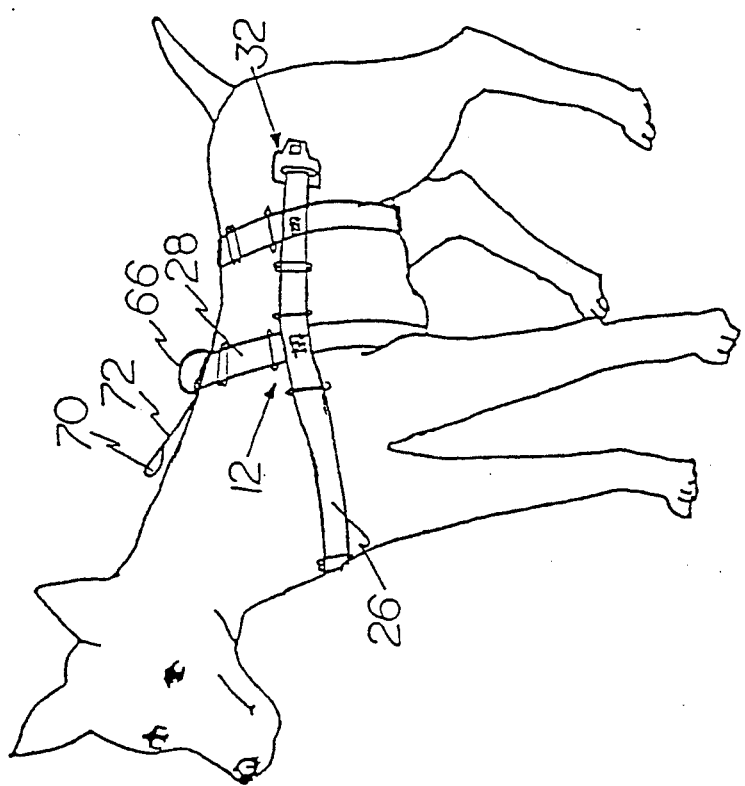
FIG. 5 illustrates the use of the harness portion of the embodiment shown in FIG. 1 as a walking harness.

FIG. 5 illustrates how the harness portion 12 may be used as a walking harness for a pet. To this end, the attachment frame 14 (not shown) is detached from the harness portion 12 at buckles 32 s(only one illustrated) so that attachment frame 14 is not dragged over the ground behind the pet. A leash (not illustrated) may be hooked to a metal eyelet 66 which is affixed to the upper semi-annular portion of chest strap 28. Alternatively, a pet collar (not shown) may be threaded through a terminal loop 70 of a collar strap 72 affixed to the upper semi-annular portion of the chest strap 28 and subsequently fastened around the neck of the pet for use in combination with a leash.

It will be readily apparent to a person skilled in the art that adjustment of the circumference or the length of the straps may be achieved by adjustment means other than the sliding buckle and eyelet combination 38, 40 described above. Furthermore, the buckle and eyelet combination may be omitted altogether and the pet safety restraint manufactured in various sizes for different size pets.

An art skilled person will also readily appreciate that the harness portion may be constructed differently than the preferred harness portion depicted in the drawings as long as the harness portion includes a pair of lateral straps, which straps are required for reliably restraining a pet from undesired lateral movement.

Although the construction of the attachment frame shown in the drawings is preferred, other constructions are possible. However, the lateral straps must be affixable to the attachment frame at spaced apart locations and the attachment frame must be reliably attachable to a vehicle seat belt or a structural element of a vehicle. For example, the attachment frame may be constructed as an elongated attachment plate with the lateral straps being affixed to the ends of the plate.

The attachment frame or plate may also include a structure other than the preferred seat belt receiving openings 41, 42 as long as a reliable fastening of the pet safety harness to the seat belt is achievable. To this end, the attachment frame or plate may have U-shaped ends for engagement with the vehicle seat belt or may have transverse slots for insertion of the seat belt.

As mentioned hereinabove, all straps are preferably made of nylon webbing. However, the straps or any part thereof, may be made of other materials generally used in the construction of pet harnesses and well known to the art skilled person, for example leather. Also, quick release buckles 29 may be replaced by Velcro TM type hook and loop connectors or similar quick release connectors.

Finally, the attachment frame may be affixed to a structural element of a vehicle by using fastening means other than the anchoring member 48 as long as the attachment frame is rigidly affixable thereby to the structural member so as to restrain the pet from lateral movement.

Thus, a pet safety restraint is disclosed herein which may be releasably fastened to a vehicle seat belt or to a structural member of a vehicle and limits the forward and lateral movement of a restrained pet in order to prevent injury to the pet and/or the passengers of the vehicle during head-on and sideways collisions.

Changes and modifications in the specifically described embodiments can be carried out without departing from the scope of the invention which is intended to be limited only by the scope of the appended claims.

We claim:

1. A pet safety restraint for use in a vehicle equipped with a seat belt having two interlocking ends, comprising: a harness means for releasably engaging the body of a pet, the harness means having a pair of lateral straps for respectively extending along the sides of the pet's body; and
a frame for connecting the lateral straps of the harness means with the vehicle seat belt, the frame having seat belt receiving means for securing the frame to the seat belt at spaced apart locations along the seat belt and a pair of lateral strap attachment means for respectively connecting one of the pair of lateral straps to the frame, the pair of lateral strap attachment means being spaced apart in longitudinal direction of the seat belt to limit lateral movement of a pet restrained by the pet safety restraint.

2. A pet safety restraint as defined in claim 1 for use in a vehicle which further includes a cargo area, further comprising:
an anchoring means for fastening the frame to a structural element of the vehicle's cargo area.

3. A pet safety restraint as defined in claim 1 or 2, wherein the frame is an elongated rigid frame having a pair of opposite frame ends and the seat belt receiving means are two spaced apart seat belt receiving openings respectively located at the opposite frame ends of the attachment frame.

4. A pet safety restraint as defined in claim 3, each of said pair of lateral straps includes a releasable connecting means for releasably interconnecting the frame with the harness means.

5. A pet safety restraint as defined in claim 4, wherein each lateral strap extends rearwardly from the harness means, when the harness means is positioned on the pet and has a rear end, the rear end being affixed to the frame and the connecting means being positioned intermediate the frame and the harness means.

6. A pet safety restraint as defined in claim 5, wherein the connecting means is a releasable buckle having complementary interlocking male and female latching members respectively affixed to the lateral strap.

7. A pet safety restraint as defined in claim 5, wherein that portion of each lateral strap which extends between the frame and the connecting means includes adjustment means for adjusting the length of this portion.

8. A pet safety restraint as defined in claim 1 or 2, wherein each one of the pair of lateral straps has a front end, the front ends being connected by a flexible breast strap extending about the breast of the pet when the harness means is positioned on the pet.

9. A pet safety restraint as defined in claim 8, wherein the harness means includes a flexible annular chest strap and a flexible annular belly strap, the chest strap extending in a loop around the chest and over the neck of the pet, when the harness means is positioned on the pet and the belly strap extending in a loop around the abdomen and over the back of the pet.

10. A pet safety restraint as defined in claim 9, wherein the breast strap, the chest strap and the belly strap are permanently affixed to the lateral straps.

11. A pet safety restraint as defined in claim 10, wherein all of the chest strap, the breast strap and the belly strap include adjustment means for adjustment of the circumference of each strap.

* * * * *